US011890621B2

(12) United States Patent
Park et al.

(10) Patent No.: US 11,890,621 B2
(45) Date of Patent: Feb. 6, 2024

(54) METHOD FOR SEPARATING AND COLLECTING SINGLE AGGREGATE FROM FUMED SILICA AND METHOD FOR CLASSIFYING SHAPE OF SINGLE AGGREGATE

(71) Applicants: OCI Company Ltd., Seoul (KR); Research & Business Foundation SUNGKYUNKWAN UNIVER, Gyeonggi-do (KR)

(72) Inventors: Younghun Park, Seongnam-si (KR); Eungchul Kim, Suwon-si (KR); Taesung Kim, Suwon-si (KR); Sangyup Lee, Seongnam-si (KR); Kyungyeol Kim, Seongnam-si (KR); Hwisu Oh, Seongnam-si (KR)

(73) Assignee: OCI Company LTd., Seoul (KR)

( * ) Notice: Subject to any disclaimer, the term of this patent is extended or adjusted under 35 U.S.C. 154(b) by 33 days.

(21) Appl. No.: 17/792,891

(22) PCT Filed: Jan. 15, 2021

(86) PCT No.: PCT/KR2021/000631
§ 371 (c)(1),
(2) Date: Jul. 14, 2022

(87) PCT Pub. No.: WO2021/145738
PCT Pub. Date: Jul. 22, 2021

(65) Prior Publication Data

US 2023/0057388 A1 Feb. 23, 2023

(30) Foreign Application Priority Data

Jan. 15, 2020 (KR) ........................ 10-2020-0005622

(51) Int. Cl.
*B03C 3/014* (2006.01)
*B03C 3/017* (2006.01)
*B03C 3/45* (2006.01)

(52) U.S. Cl.
CPC ............ *B03C 3/0175* (2013.01); *B03C 3/014* (2013.01); *B03C 3/45* (2013.01); *B03C 2201/32* (2013.01)

(58) Field of Classification Search
CPC ....... B03C 2201/32; B03C 3/45; B03C 3/014; B03C 3/0175

(Continued)

(56) References Cited

U.S. PATENT DOCUMENTS 7,880,109 B2 * 2/2011 Okuda ............... G01N 15/0266 209/129
8,038,971 B2 10/2011 Davis et al.

(Continued)

FOREIGN PATENT DOCUMENTS

CN 102203010 A * 9/2011 ............. B82Y 30/00
JP 2017-524770 A 8/2017

(Continued)

OTHER PUBLICATIONS

International Preliminary Report on Patentability Received for International Application No. PCT/KR2021/000631 dated Jul. 28, 2022, 9 Pages.

(Continued)

*Primary Examiner* — Terrell H Matthews
(74) *Attorney, Agent, or Firm* — HoustonHogle LLP

(57) ABSTRACT

The present invention relates to a method for separating and collecting single aggregates from fumed silica, and a method for classifying a shape of the collected single aggregates, and more specifically, includes preparing a slurry in which fumed silica is dispersed in water; aerosolizing the slurry;

(Continued)

and collecting single aggregates of the finned silica in the aerosol using the electric field.

12 Claims, 12 Drawing Sheets

(58) Field of Classification Search
USPC .......................................................... 209/129
See application file for complete search history.

(56) References Cited

U.S. PATENT DOCUMENTS

| | | | | |
|---|---|---|---|---|
| 8,052,788 | B2 | 11/2011 | MacDonald | |
| 9,359,215 | B2 | 6/2016 | Allain et al. | |
| 9,803,106 | B2 * | 10/2017 | Grumbine | H01L 21/3212 |

FOREIGN PATENT DOCUMENTS

| | | | | |
|---|---|---|---|---|
| KR | 10-2005-0010376 | A | 1/2005 | |
| KR | 10-2005-0079124 | A | 8/2005 | |
| KR | 10-2009-0109376 | A | 10/2009 | |
| KR | 10-1363588 | B1 | 2/2014 | |
| WO | WO-2015200678 | A1 * | 12/2015 | B24B 1/00 |

OTHER PUBLICATIONS

International Search Report of the International Searching Authority, dated Apr. 19, 2021, from International Application No. PCT/KR2021/000631, filed on Jan. 15, 2021.
Written Opinion dated Apr. 19, 2021, from International Application No. PCT/KR2021/000631, filed on Jan. 15, 2021. 6 pages.
Grulke, EA., et al., "Size and Shape Distribution of Carbon Black Aggregates by Transmission Electron Microscopy," Carbon, 1-48 (2018).

* cited by examiner

METHOD FOR SEPARATING AND COLLECTING SINGLE AGGREGATE FROM FUMED SILICA AND METHOD FOR CLASSIFYING SHAPE OF SINGLE AGGREGATE

RELATED APPLICATIONS

This application is a § 371 National Phase Application of International Application No. PCT/KR2021/000631, filed on Jan. 15, 2021, now International Publication No. WO 2021/145738 A1, published on Jul. 22, 2021, which International Application claims priority to Korean Application 10-2020-0005622, filed on Jan. 15, 2020, both of which are incorporated herein by reference in their entirety.

TECHNICAL FIELD

The present invention relates to a method for separating and collecting single aggregates from fumed silica and a method for classifying a shape of the collected single aggregates.

BACKGROUND ART

High integration of a semiconductor device progresses yearly. Accordingly, in a manufacturing process of the semiconductor device, quality required for a surface of each layer becomes stricter year by year. In accordance with this requirement, in a chemical mechanical polishing method (hereinafter, CMP), which is a semiconductor surface processing technology, for a polishing object, it is required that the CMP has less contamination, less scratches, high polishing rate, and high selectivity for a target object to be polished. In general, silica, cerium oxide, or the like is used as abrasive particles for the CMP.

Fumed silica may form secondary particles by strongly aggregating primary particles with one another by fusion. The secondary particles may slightly aggregate with one another to form tertiary particles. In general, finned silica in a powder state may exist as the tertiary particles.

DISCLOSURE OF THE INVENTION

Technical Problem

The present invention provides a method for separating and collecting single aggregates, which is a secondary particle, from fumed silica.

The present invention provides a method for classifying a shape of the collected single aggregates.

Technical Solution

A method for separating and collecting single aggregates from fumed silica according to the inventive concept of the present invention may include preparing a slurry in which firmed silica is dispersed in water, aerosolizing the slurry, and collecting single aggregates of the finned silica in the aerosol using an electric field.

A method for classifying a shape of single aggregates of finned silica according to the inventive concept of the present invention may include performing a shape classification algorithm on the image of the single aggregates to classify a shape of single aggregates. The shape classification algorithm may include determining whether au aspect ratio of the single aggregates is greater than a first value, determining whether a roundness of the single aggregates is greater than a second value, and determining whether a solidity of the single aggregates is greater than a third value.

Advantageous Effects

The method for collecting single aggregates according to the present invention may collect only single aggregates by effectively separating the aggregates from one another, even though the aggregates are easily aggregated with one another. By analyzing the shape of the collected single aggregates, a grade of the fumed silica may be analyzed, and further, may be used as an index for analyzing performance of an abrasive. Additionally, a manufacturing process guideline for the fumed silica to have the single aggregates into a desired shape may be provided.

MODE FOR CARRYING OUT THE INVENTION

In order to facilitate sufficient understanding of the configuration and effects of the present invention, preferred embodiments of the present invention will be described with reference to the accompanying drawings. However, the present invention is not limited to the embodiments set forth below, and may be embodied in various forms and modified in many alternate forms. Rather, these embodiments are provided so that this disclosure will be thorough and complete, and will fully convey the scope of the present invention to those skilled in the art to which the present invention pertains.

'The terms used herein are for the purpose of describing embodiments and are not intended to be limiting of the present invention. In the present description, singular forms include plural forms unless the context clearly indicates otherwise. As used herein, the terms 'comprises' and/or 'comprising' are intended to be inclusive of the stated elements, and do not exclude the possibility of the presence or the addition of one or more other elements.

Figure 1:
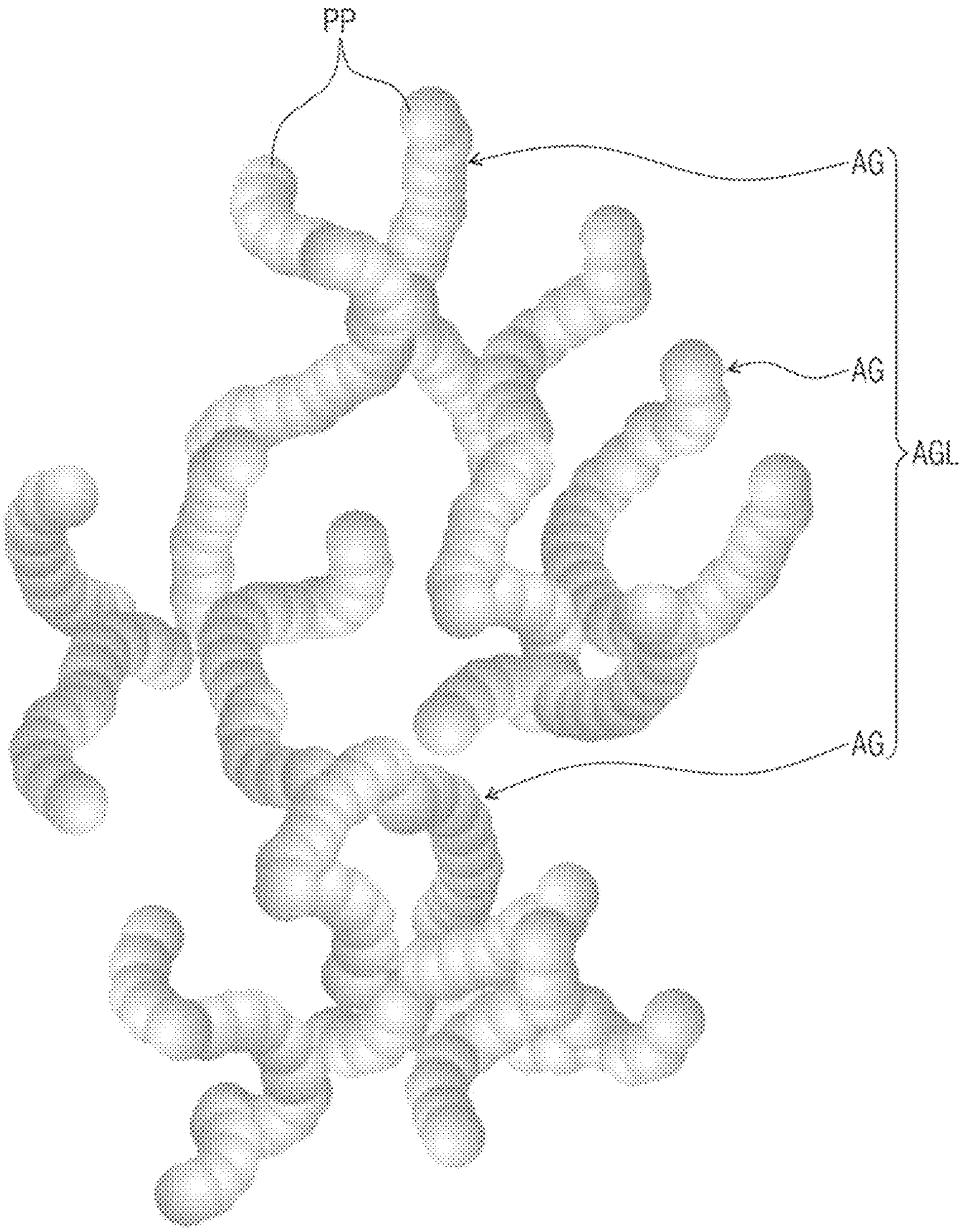
FIG. 1 is a schematic diagram for illustrating particles of fumed silica.

FIG. 1 is a schematic diagram for illustrating particles of fumed silica.

Referring to FIG. 1, fumed silica in a powder state may include particles in a form of an agglomerate AGL, as shown in FIG. 1. When the particles of the fumed silica powder are enlarged, the agglomerate AGL shown in FIG. 1 may be confirmed. The agglomerate AGL may be a tertiary particle of fumed silica.

The agglomerate AGL of fumed silica may be formed by gathering a plurality of aggregates AG. The agglomerates AG may be secondary particles of the fumed silica. The aggregates AG may be formed of a plurality of primary particles PP (elementary particles). For example, an average diameter of the primary particles PP may be 5 nm to 50 mu.

The finned silica may be formed by hydrolysis of silicon chloride in a flame over 1000° C. formed of oxygen and hydrogen. The agglomerates AG, which are secondary particles, may be formed as the primary particles PP are connected to one another due to collision therebetween formed in the flame. That is, the aggregates AG may include a plurality of elementary particles PP. The aggregates AG may have a three-dimensional structure. Thereafter, as the aggregates AG are agglomerated with one another, the agglomerate AGL, which is a tertiary particle, may be formed.

The fumed silica may be used in an abrasive used in a semiconductor process (e.g., a CMP process). In the abrasive, the agglomerate AGL of the fumed silica may be dispersed as the agglomerates AG, which are secondary particles. That is, the aggregates AG of the fumed silica are particles used for polishing in the CMP process. Accordingly, performance of the abrasive may be determined depending on a shape and size of each of the aggregates AG.

The fumed silica may form the secondary particles (the aggregates, AG) by strongly aggregating the primary particles with one another by fusion. The secondary particles may agglomerate weakly with one another to form the tertiary particle (the agglomerate, AGL). In general, the fumed silica powder may exist as the tertiary particle. When being strongly dispersed in water, the fumed silica is dispersed to a size of the secondary particles, but not to a size of the primary particles. Therefore, it is known that the CMP is performed in a state of secondary particles. When an enlargement of the secondary particles in the abrasive is suppressed, occurrence of scratches on a surface to be polished may be reduced, and therefore roughness of the surface may be reduced.

For analyzing the performance of the abrasive, it may be necessary to separately collect and analyze the single aggregates AG from the fumed silica used in the abrasive, or from the abrasive. However, it is technically difficult to separate and collect the single aggregates (i.e., single secondary particles) from the finned silica due to effects of surface hydrogen bonding of the fumed silica, thickening effect, and pH. The term "single aggregate" used in the present invention may mean that the aggregate AG, which is the secondary particle of the fumed silica, does not aggregate with other aggregates AG, and exists as one secondary particle alone.

When the single agglomerates are analyzed to systematically classify their shapes, it may help in the abrasive performance analysis. However, a systematic algorithm for classifying the shape of the single aggregates of the fumed silica has not been established.

According to embodiments of the present invention, a method for separating and collecting single aggregates from an abrasive or fumed silica may be provided. The collected single aggregates are analyzed by an image analysis, and a shape of the single aggregates may be classified into one of a linear shape, a branched shape, an elliptical shape, and a circular shape according to the algorithm presented in the present invention. By analyzing the shape of the single aggregates, a grade of the finned silica may be analyzed, and further, it may be used as an index for analyzing performance of the abrasive. Additionally, a manufacturing process guideline for the finned silica to have the single aggregates into a desired shape may be provided.

Figure 2:
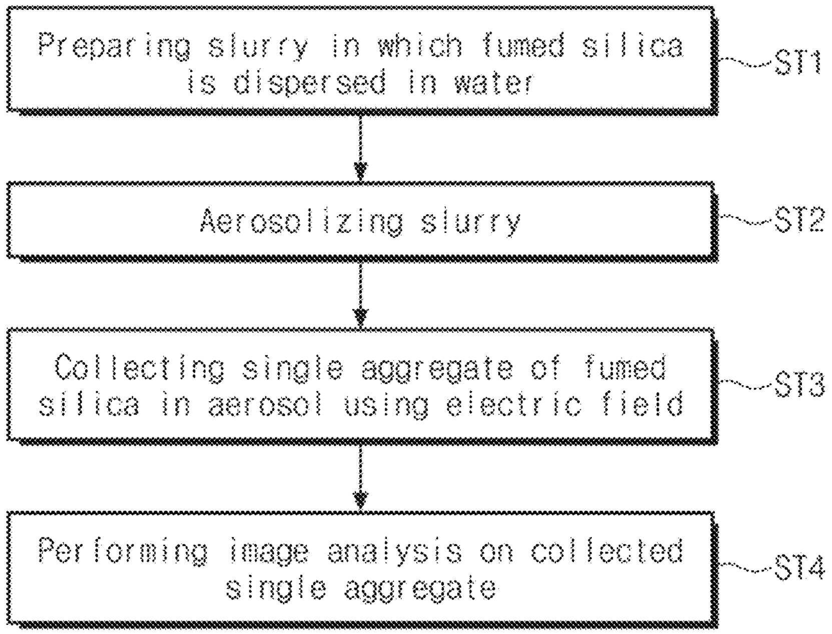
FIG. 2 is a flowchart for illustrating a method for separating and collecting single aggregates from fumed silica according to embodiments of the present invention.
Figure 3:
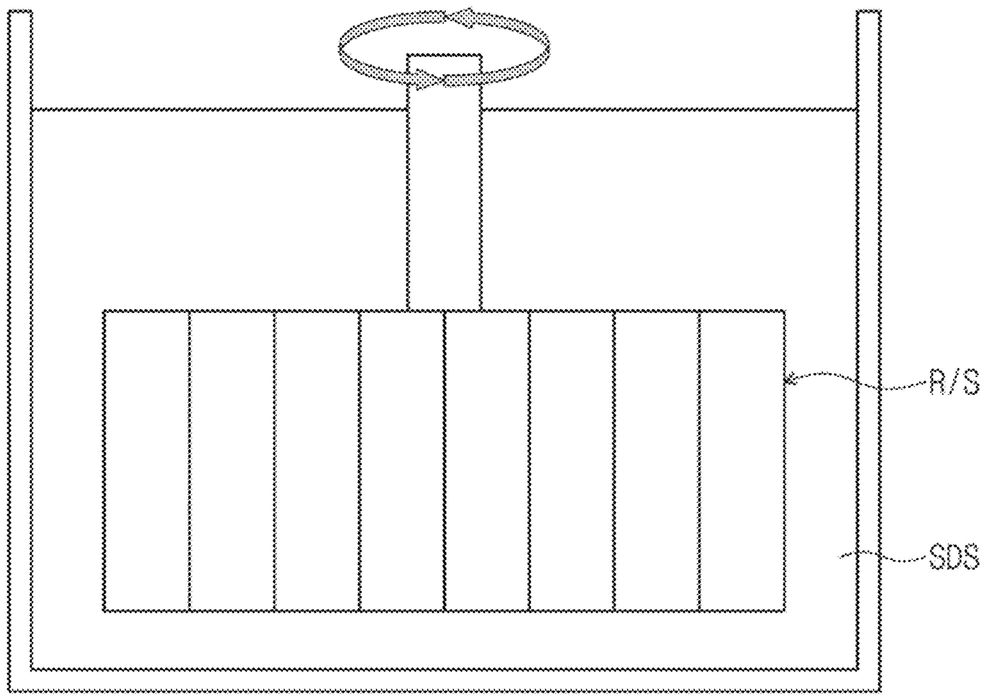
FIG. 3 is a conceptual diagram for illustrating forming a slurry from fumed silica.
Figure 4:
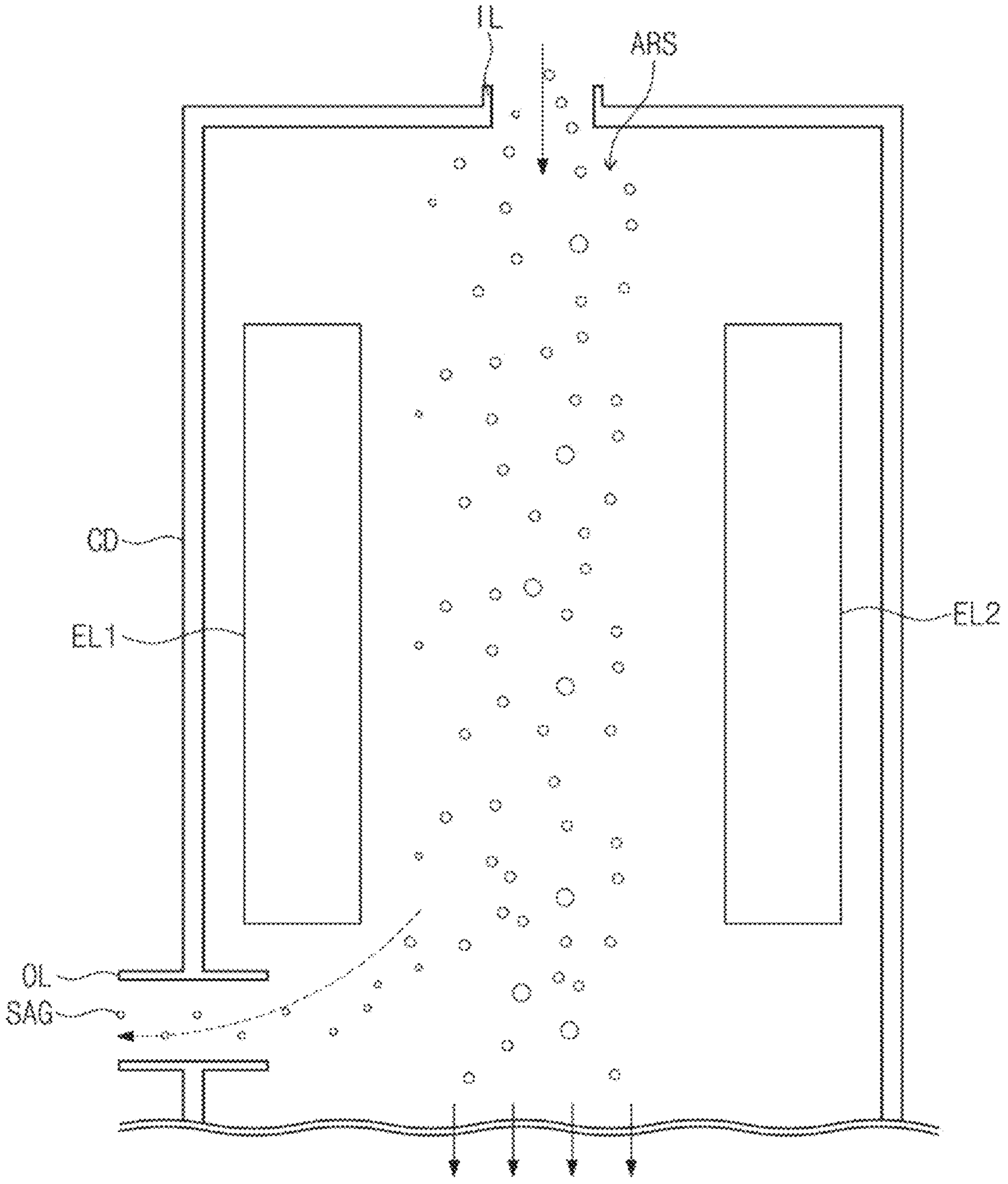
FIG. 4 is a conceptual diagram for illustrating collecting single aggregates of fumed silica in an aerosol.

First, the method for separating and collecting the single aggregates from the finned silica will be described. FIG. 2 is a flowchart for illustrating a method for separating and collecting single aggregates from fumed silica according to embodiments of the present invention. FIG. 3 is a conceptual diagram for illustrating forming a slurry from fumed silica. FIG. 4 is a conceptual diagram for illustrating collecting single aggregates of fumed silica in an aerosol.

Referring to FIGS. 2 and 3, a slurry in which the fumed silica is dispersed in water from a fumed silica powder in ST1 may be formed. Specifically, a slurry SDS may be prepared by mixing the fumed silica powder with water (e.g., DI WATER). The fumed silica powder may be evenly dispersed in the slurry SDS through a rotor/stator R/S, which is a high-speed homogenizer. For example, the rotor may rotate at 3,000 RPM to 4,000 RPM and may be operated for 10 to 30 minutes.

The rotor/stator R/S physically may collide with the particles and pulverizes the particles into small pieces, and thus the agglomerate AGL, which is a tertiary particle, may be pulverized and dispersed in the slurry SDS in a form of the aggregates AG, which are secondary particles.

Thereafter, a basic pH adjusting agent such as potassium hydroxide (KOH) and/or sodium hydroxide (NaOH) may be added to the slurry SDS to adjust a pH of the slurry SDS to 10 to 12. When the pH of the slurry SDS is adjusted to 10 to 12, the fumed silica (e.g., the aggregates AG) dispersed in the slurry SDS may be stabilized.

While forming the slurry SDS, a temperature of the shiny SDS may be increased by the rotor/stator R/S. Here, the temperature of the slurry SDS may be maintained at 10° C. to 25° C. using a cooling device.

Referring to FIG. 2, the slurry SDS may be aerosolized in ST2. Forming the aerosol from the shiny SDS may use a method of atomization of a solution. For example, the slurry SDS may be sprayed in a form of a mist using a nozzle, thereby forming the aerosol.

Referring to FIGS. 2 and 4, the aerosol ARS may be injected into a collection device CD, and the single aggregates SAG may be collected from the aerosol ARS in ST3. Specifically, the aerosol ARS may be injected into an inlet IL of the collection device CD. The injected aerosol ARS may flow between a first electrode EL1 and a second electrode EL2 of the collection device CD. An electric field may be formed between the first electrode EL1 and the second electrode EL2. For example, a positive voltage may be applied to the first electrode EL1 and a ground voltage may be applied to the second electrode EL2. The electric field may be formed by a potential difference between the first electrode EL1 and the second electrode EL2.

A size of the single aggregates SAG in the aerosol ARS may be very fine (300 nm or less), and thus the single aggregates SAG may move closer to the first electrode EL1 by the electric field. For example, the single aggregates SAG may have a negative charge, and thus the single aggregates SAG may move toward the first electrode EL1 to which a positive voltage is applied, through electrical attraction.

Accordingly, the single aggregates SAG may be collected and pass through a collecting port OL located under the first electrode ELL Particles other than the single aggregates SAG may relatively be large in size, and thus the particles may not be collected through the collecting port OL and may fall toward a bottom of the collecting device CD.

Then, a plurality of single aggregates SAG may be collected in a form separated from one another. An image analysis may be performed on each of the separated single aggregates SAG in ST4. For example, microscopy may be performed on each of the single aggregates SAG. A TEM analysis was performed and resulting images are shown in FIGS. 5A to 5D. As illustrated in FIGS. 5A to 5D, the single aggregates SAG may have various shapes.

Figure 6:
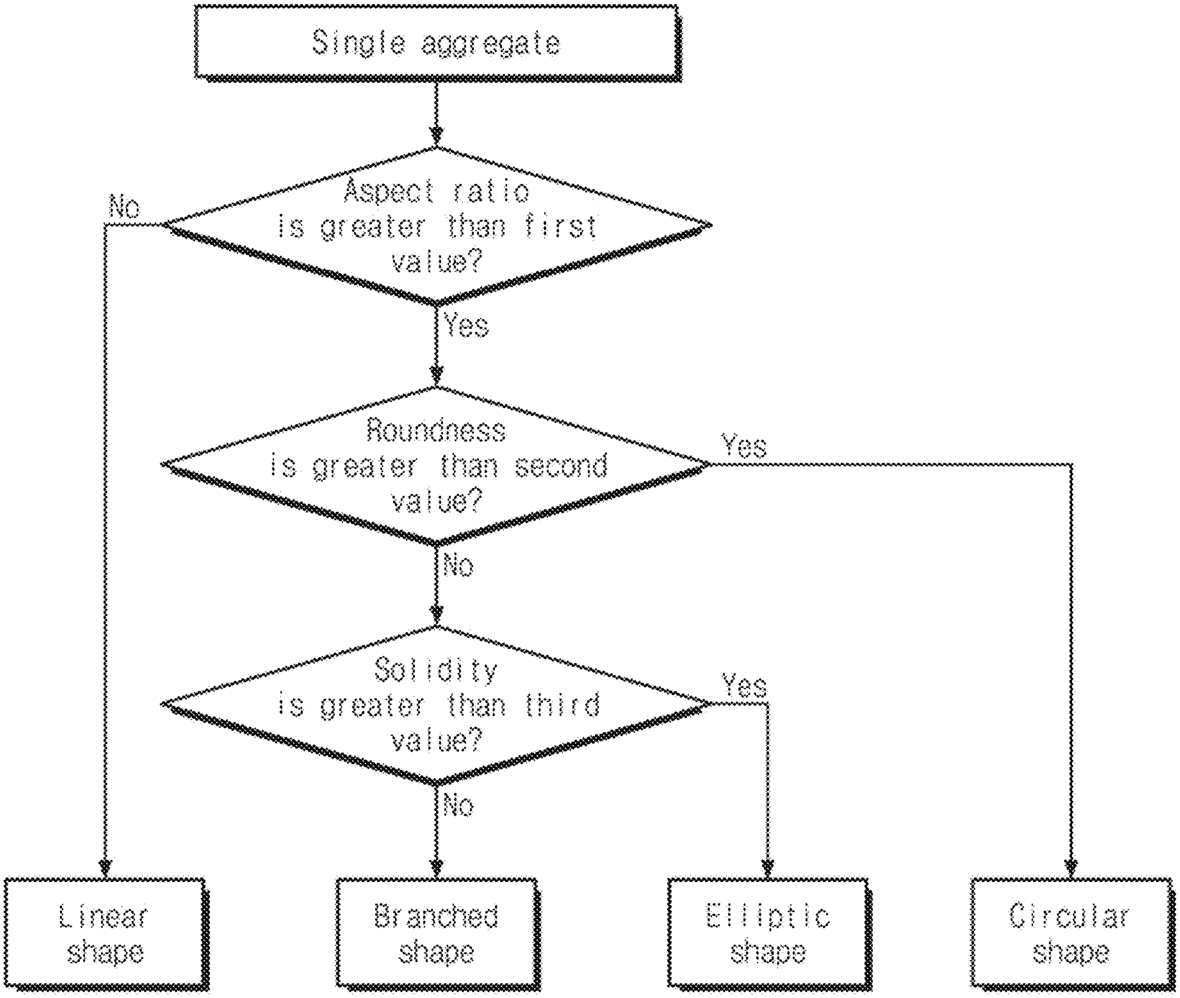
FIG. 6 is an algorithm for classifying a shape of single aggregates according to embodiments of the present invention.

A shape classification method for systematically classifying the shape of the single aggregates SAG will be described. FIG. 6 is an algorithm for classifying a shape of single aggregates according to embodiments of the present invention.

Referring to FIG. 6, various parameters used in a shape classification algorithm of single aggregates SAG may be measured first. The parameters used in the algorithm include an aspect ratio, a roundness, and a solidity.

Figure 7:
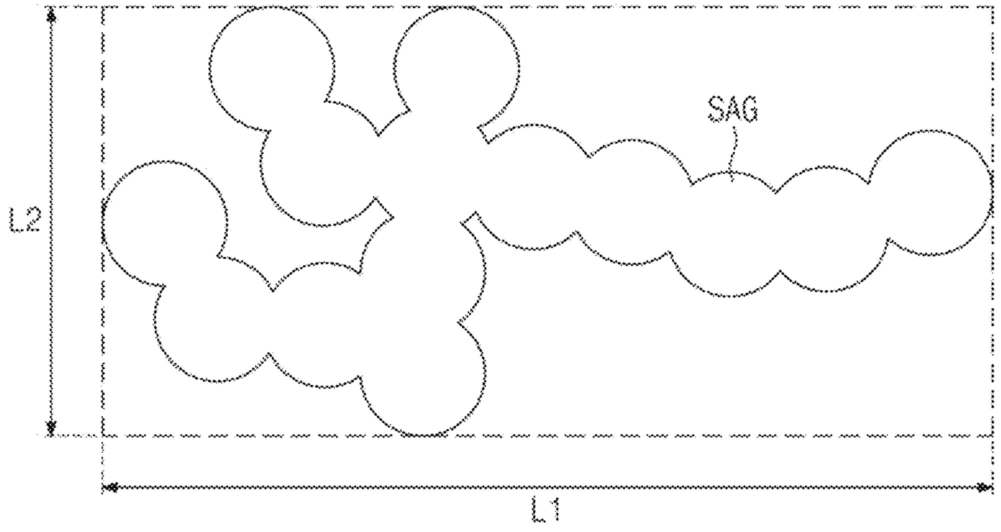
FIG. 7 is a conceptual diagram for illustrating an aspect ratio of single aggregates.

The aspect ratio of the single aggregates SAG will be described with reference to FIG. 7. Referring to a TEM image obtained through an image analysis, the single aggregates SAG may have the longest first length L1 in a first direction. The single aggregates SAG may have the shortest second length L2 in a second direction intersecting the first direction. A ratio L2/L1 of the second length L2 to the first length L1 may be defined as the aspect ratio.

Figure 8:
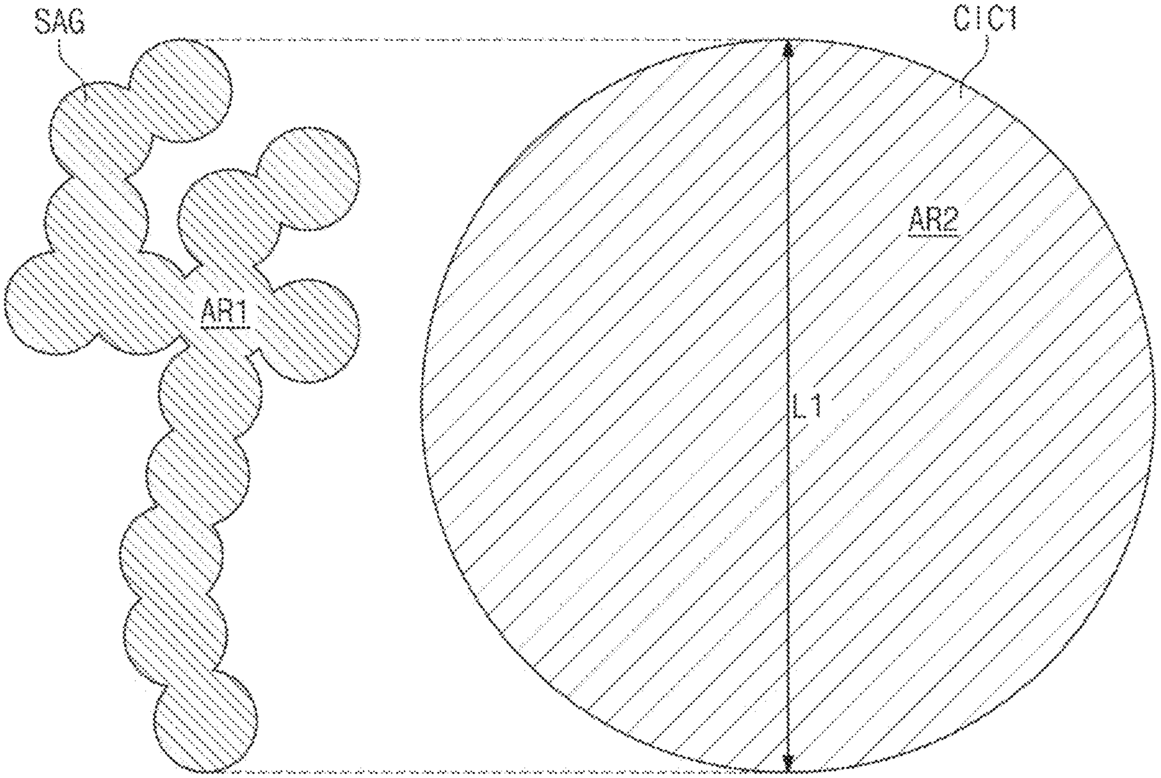
FIG. 8 is a conceptual diagram for illustrating a roundness of single aggregates.

The roundness of the single aggregates SAG will be described with reference to FIG. 8. The single aggregates SAG shown in a TEM image may have a first area AR1, two-dimensionally. Meanwhile, a first circle CIC1 having a diameter of the first length L1 of the single aggregates SAG shown in FIG. 7 may be defined. The first circle CIC1 may have a second area AR2. The roundness may be a ratio AR1/AR2 of the first area AR1 to the second area AR2.

Specifically, the second area AR2 may have the following value.

$$AR2 = \frac{\pi \cdot L1^2}{4}$$

Accordingly, the roundness may be calculated by Equation 1 below.

$$\text{Roundness} = \frac{4 \cdot AR1}{\pi \cdot L1^2} \qquad \text{[Equation 1]}$$

Figure 9:
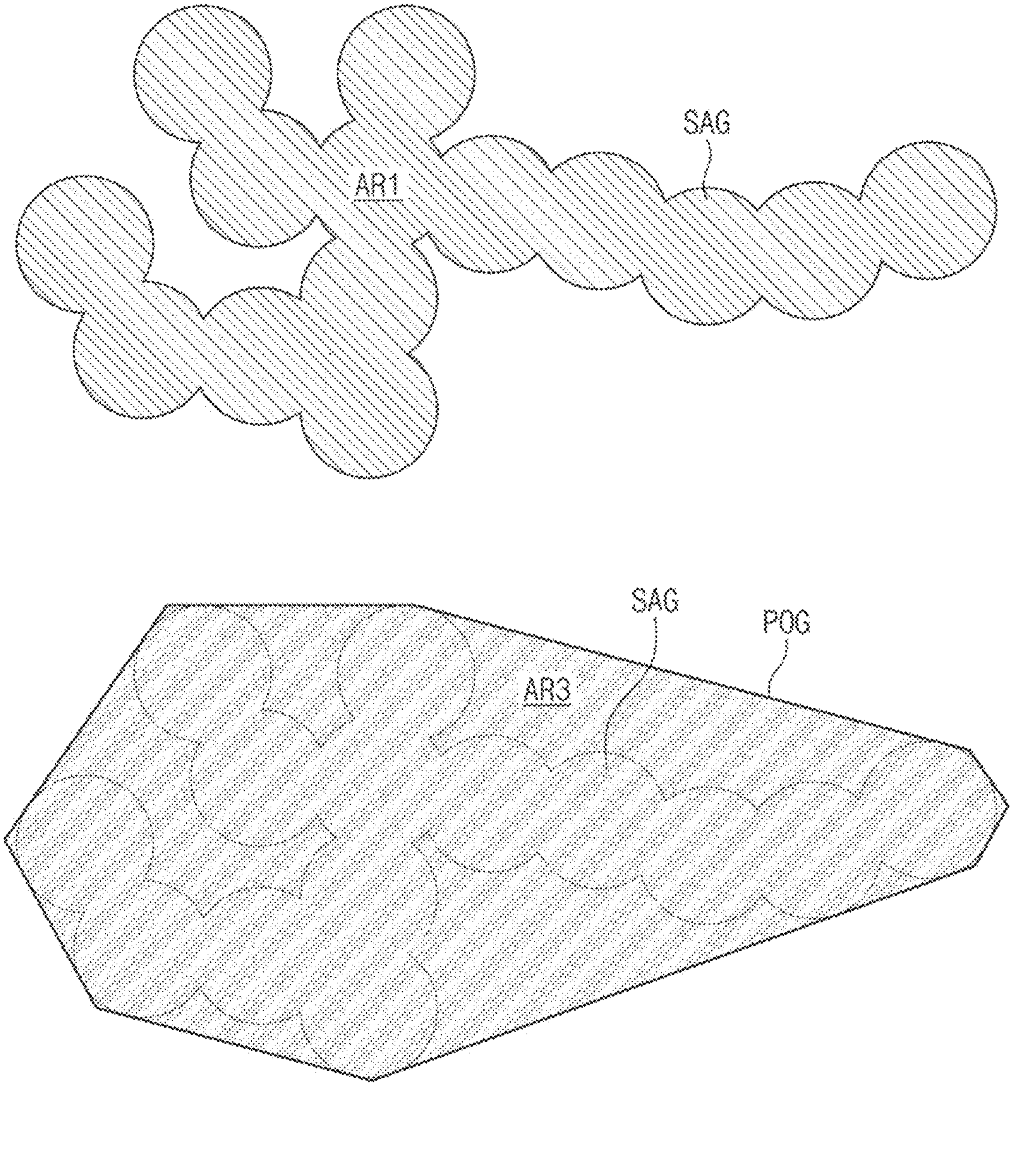
FIG. 9 is a conceptual diagram for illustrating a solidity of single aggregates.

The solidity of the single aggregates SAG will be described with reference to FIG. 9. The single aggregates SAG shown in a TEM image may have the first area AR1, two-dimensionally. The outermost of the single aggregates SAG with a straight line may be connected to define a polygon POG including the single aggregates SAG. The polygon POG may have a third area AR3. The solidity may be a ratio AR1/AR3 of the first area AR1 to the third area AR3.

Figure 5A:
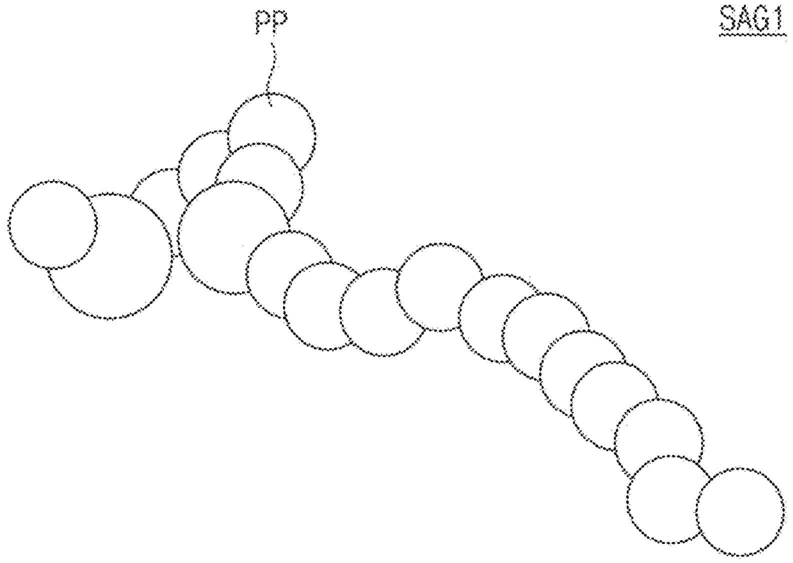
FIGS. 5A to 5D are images each illustrating single aggregates having various shapes.

In one embodiment, an algorithm of FIG. 6 based on a TEM image of a first single aggregates SAG1 shown in FIG. 5A is performed, and it will be described that a shape of the first single aggregates SAG1 is classified. An aspect ratio of the first single aggregates SAG1 is measured to determine whether the aspect ratio is greater than a first value. For example, the first value may be 0.533. Because the aspect ratio of the first single aggregates SAG1 is less than the first value (0.533), the shape of the first single aggregates SAG1 may be classified as a linear shape.

Figure 5B:
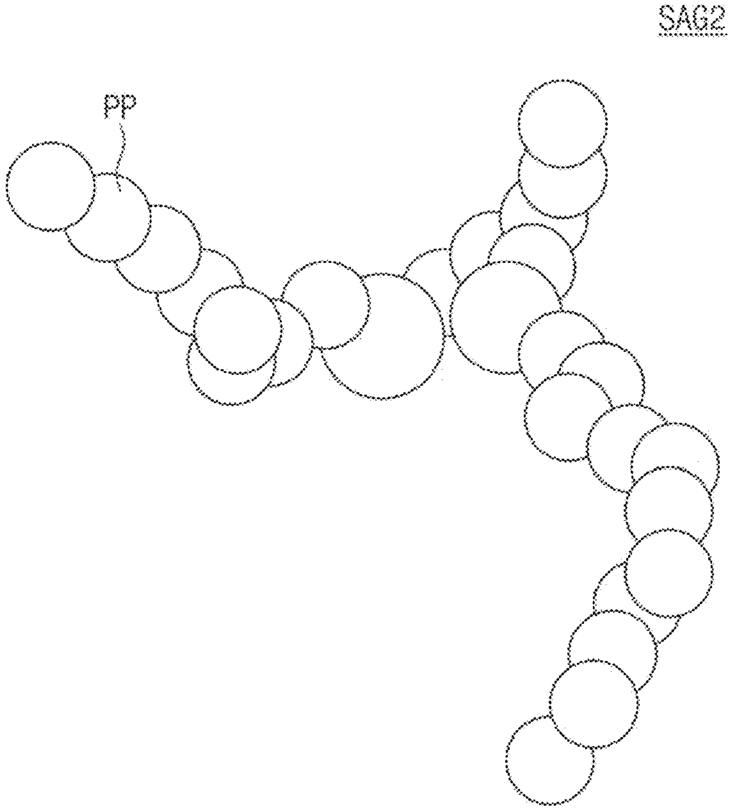
Figure 5C:
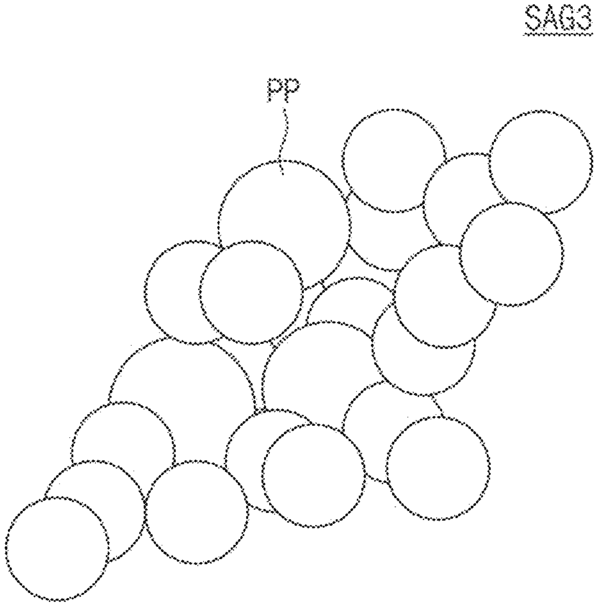
Figure 5D:
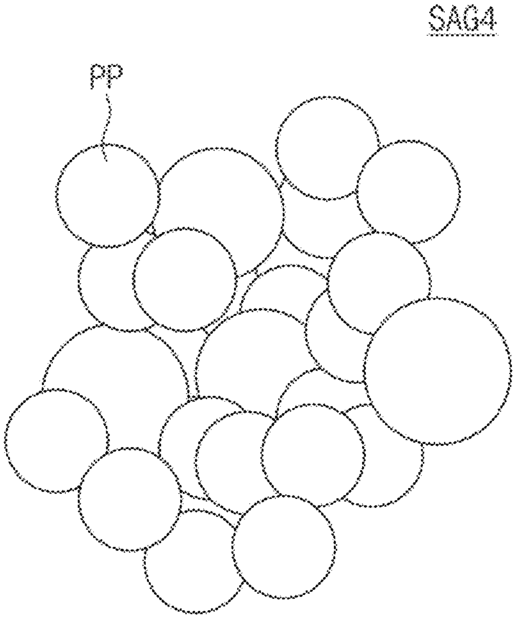

In one embodiment, the algorithm of FIG. 6 is performed based on a TEM image of a fourth single aggregates SAG4 shown in FIG. 5D, and it will be described that a shape of the fourth single aggregates SAG4 is classified. An aspect ratio of the fourth single aggregates SAG4 is measured to determine whether the aspect ratio is greater than the first value. The aspect ratio of the fourth single aggregates SAG4 is greater than the first value (0.533), and then the roundness, a next step, is measured. It is checked whether the roundness of the fourth single aggregates SAG4 is greater than a second value. For example, the second value may be 0.7. Because the roundness of the fourth single aggregates SAG4 is greater than the second value (0.7), the shape of the fourth single aggregates SAG4 may be classified as a circular shape.

In one embodiment, the algorithm of FIG. 6 is performed based on a TEM image of a third single aggregates SAG3 shown in FIG. 5C and it will be described that a shape of the third single aggregates SAG3 is classified. An aspect ratio of the third single aggregates SAG3 is measured to determine whether the aspect ratio is greater than the first value. The aspect ratio of the third single aggregates SAG3 is greater than the first value (0.533), and then the roundness, the next step, is measured. The roundness of the third single aggregates SAG3 is less than the second value (0.7), and then the solidity, a next step, is measured. It is checked whether the solidity of the third single aggregates SAG3 is greater than a third value. For example, the third value may be 0.76. Because the solidity of the third single aggregates SAG3 is greater than the third value (0.76), the shape of the third single aggregates SAG3 may be classified as an elliptical shape.

In one embodiment, the algorithm of FIG. 6 is performed based on a TEM image of a second single aggregates SAG2 shown in FIG. 5B and it will be described that a shape of the second single aggregates SAG2 is classified. An aspect ratio of the second single aggregates SAG2 is measured to determine whether the aspect ratio is greater than the first value. The aspect ratio of the second single aggregates SAG2 is greater than the first value (0.533), and then the roundness, the next step, is measured. The roundness of the second single aggregates SAG2 is less than the second value (0.7), and then the solidity, the next step, is measured. Because the solidity of the second single aggregates SAG2 is less than the third value (0.76), the shape of the second single aggregates SAG2 may be classified as a branched shape.

As described above, according to an embodiment of the present invention, the above-described parameters (aspect ratio, roundness, and solidity) may be measured through the TEM image of the single aggregates, and the algorithm of FIG. 6 may be performed through the measured parameters, and thus the shape of the single aggregates may be classified as one of the linear shape, the branched shape, the elliptical shape and the circular shape.

The shape classification may be performed on 20 to 100 single aggregates at random among the single aggregates separated and collected from the fumed silica as an analysis target, and a shape distribution ratio of the single aggregates of the finned silica as the analysis target may be measured.

For example, as a result of performing the shape classification on 100 single aggregates collected from the finned silica, it was confirmed that 20 single aggregates were linear, 50 single aggregates were branched, and 20 single aggregates were elliptical, 10 single aggregates were circular. In this case, it may be confirmed that the fumed silica has the shape distribution ratio of 20% linear shape, 50% branched shape, 20% elliptical shape, and 10% circular shape. It may be seen that the fumed silica is mainly composed of the single aggregates having an elongated shape rather than a round shape such as an oval or a circular shape.

Figure 10:
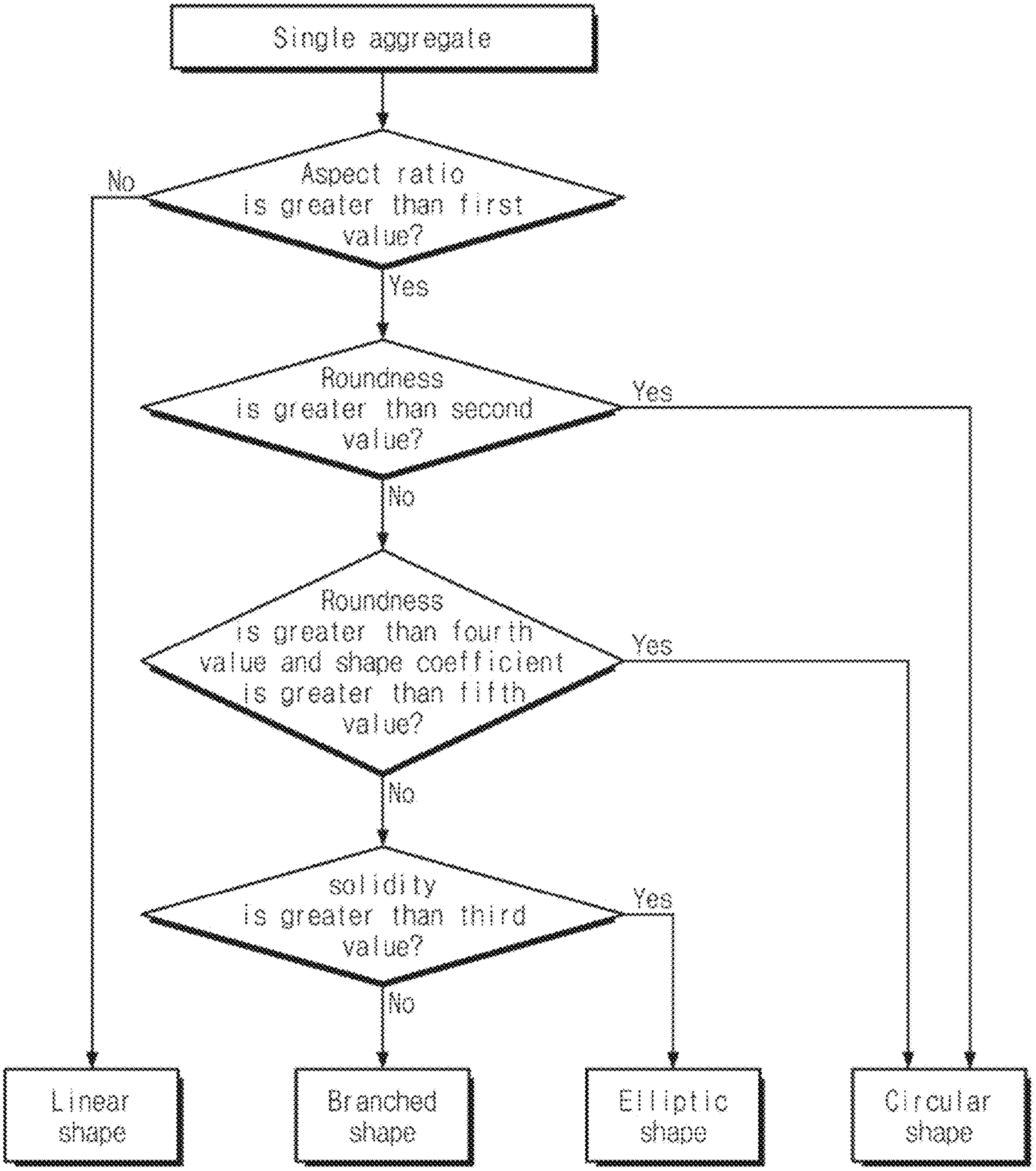
FIG. 10 is an algorithm for classifying a shape of single aggregates according to another embodiment of the present invention.

FIG. 10 is an algorithm for classifying a shape of single aggregates according to another embodiment of the present invention.

Referring to FIG. 10, an algorithm according to the present embodiment may add one more step compared to the algorithm of FIG. 6. Accordingly, a form factor may be added as a parameter used in the corresponding step.

Figure 11:
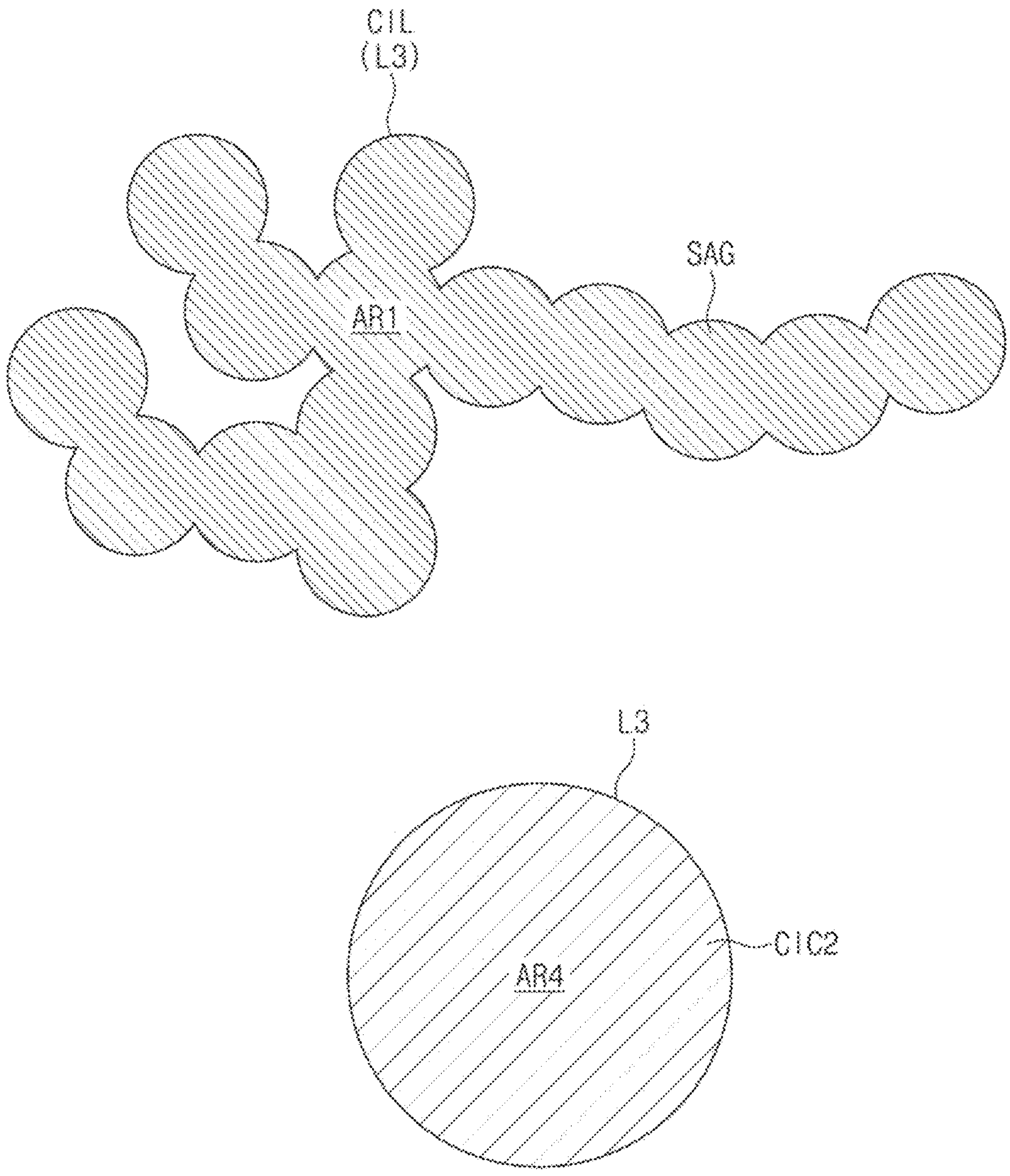
FIG. 11 is a conceptual diagram for illustrating a shape coefficient of single aggregates.

A shape coefficient of single aggregates SAG will be described with reference to FIG. 11. The single aggregates SAG shown in a TEM image may have a first area AR1, two-dimensionally. A circumference CIL of the single aggregates SAG may have a third length L3. Meanwhile, a second circle CIC2 having the third length L3 as a circumference may be defined. The second circle CIC2 may have a fourth area AR4. A shape factor may be a ratio AR1/AR4 of the first area AR1 to the fourth area AR4.

Specifically, the fourth area AR4 may have the following value.

$$AR4 = \frac{L3^2}{4 \cdot \pi}$$

Accordingly, a shape coefficient may be calculated by Equation 2 below.

$$\text{Form factor} = \frac{4 \cdot \pi \cdot AR1}{L3^2} \quad \text{[Equation 2]}$$

In one embodiment, the algorithm of FIG. 10 is performed based on a TEM image of a fourth single aggregates SAG4 shown in FIG. 5D, it will be described that a shape of the fourth single aggregates SAG4 is classified. The aspect ratio of the fourth single aggregates SAG4 is measured to determine whether it is greater than the first value. The aspect ratio of the fourth single aggregates SAG4 is greater than the first value (0.533), and then the roundness, the next step, is measured. When the roundness of the fourth single aggregates SAG4 is less than the second value (0.7), it is next checked whether the roundness is greater than a fourth value. The fourth value may be a value smaller than the second value, for example, 0.634.

When the roundness is greater than the fourth value, the shape coefficient of the fourth single aggregates SAG4 is measured. It is checked whether the shape coefficient of the fourth single aggregates SAG4 is greater than a fifth value. For example, the fifth value may be 0.06. Because the shape coefficient of the fourth single aggregates SAG4 is greater than the fifth value (0.06), the shape of the fourth single aggregates SAG4 may be classified as a circular shape.

In another embodiment of the present invention, a method of separating and collecting single aggregates from fumed silica may include a method of separating and collecting single aggregates from an abrasive.

The abrasive may be a slurry in which the fumed silica is already dispersed in water. Therefore, in the method of separating and collecting single aggregates in the abrasive, the forming of the slurry in ST1 described above with reference to FIGS. 2 and 3 may be omitted. It may be desirable to adjust the pH to 10 to 12 by adding a pH adjusting agent to the abrasive slurry. If necessary, more water may be added to the abrasive slurry to lower a viscosity.

Subsequent steps may be the same as those described with reference to FIGS. 2 and 4. By performing the shape classification described above on the collected single aggregates SAG, the shape distribution of the fumed silica aggregates in the abrasive may be confirmed. Based on the shape distribution ratio of the agglomerates in the abrasive, a correlation between the performance of the abrasive and the shape distribution ratio of the agglomerates may be analyzed.

The invention claimed is:

1. A method for separating and collecting single aggregates from fumed silica, the method comprising:
- preparing a slurry in which fumed silica is dispersed in water;
- aerosolizing the slurry; and
- collecting single aggregates of the fumed silica in the aerosol using an electric field.

2. The method of claim 1, wherein the preparing of the slurry in which the fumed silica is dispersed in the water includes:
- mixing the water and fumed silica powder to form the slurry; and
- adjusting a pH of the shiny to 10 to 12.

3. The method of claim 2, wherein the mixing of the water and the fumed silica powder includes dispersing the fumed silica powder in the water using a rotor/stator.

4. The method of claim 2, wherein the adjusting of the pH of the slurry includes adding a pH adjusting agent including potassium hydroxide (KOH) or sodium hydroxide (NaOH).

5. The method of claim 1, wherein the slurry includes an abrasive in which the fumed silica is dispersed in the water.

6. The method of claim 1, wherein the electric field is formed between first and second electrodes of a collection device,
- wherein a positive voltage is applied to the first electrode, and
- wherein the single aggregates in the aerosol moves toward the first electrode and is collected.

7. The method of claim 1, further comprising performing an image analysis on the collected single aggregates.

8. A method for classifying a shape of single aggregates, the method comprising performing a shape classification algorithm on an image of the single aggregates obtained in claim 1,
- wherein the shape classification algorithm includes:
- determining whether an aspect ratio of the single aggregates is greater than a first value;
- determining whether a roundness of the single aggregates is greater than a second value; and
- determining whether a solidity of the single aggregates is greater than a third value.

9. The method of claim 8, wherein, when the aspect ratio of the single aggregates is less than the first value, the shape of the single aggregates is classified as a linear shape.

10. The method of claim 8, wherein, when the aspect ratio of the single aggregates is greater than the first value and the roundness is greater than the second value, the shape of the single aggregates is classified as circular.

11. The method of claim 8, wherein, when the aspect ratio of the single aggregates is greater than the first value, the roundness is less than the second value, and the solidity is greater than the third value, the shape of the single aggregates is classified as an elliptic shape.

12. The method of claim 8, wherein, when the aspect ratio of the single aggregates is greater than the first value, the roundness is less than the second value, and the solidity is less than the third value, the shape of the single aggregates is classified as a branched shape.

* * * * *